United States Patent [19]

Bloxham

[11] 4,258,958
[45] Mar. 31, 1981

[54] SELECTIVE CONTROL OF FLUID TO BRAKES

[75] Inventor: Wayne N. Bloxham, Lincoln, Calif.

[73] Assignee: Selectra-Trac, Inc., Auburn, Calif.

[21] Appl. No.: 38,442

[22] Filed: May 14, 1979

[51] Int. Cl.³ .............................................. B60T 13/00
[52] U.S. Cl. ..................................... 303/6 A; 188/16; 188/354; 303/15; 303/18
[58] Field of Search ....................... 303/3, 18, 19, 6 R, 303/6 A, 13-17, 84; 188/345, 354, 16, 151 A

[56] References Cited

U.S. PATENT DOCUMENTS

| | | | |
|---|---|---|---|
| 1,682,781 | 9/1928 | Gardner | 303/6 R |
| 3,054,476 | 9/1962 | Corrigan, Jr. | 188/16 X |

Primary Examiner—Douglas C. Butler
Attorney, Agent, or Firm—Thorpe, North, Western & Gold

[57] ABSTRACT

A system for selectively controlling the flow of brake fluid to the brakes of a two or four wheel drive vehicle utilizes a separate solenoid valve on each brake fluid line leading directly to a driven wheel. The valves are normally open, and are operated by primary and secondary electrical switches arranged in series. The primary electrical switch must be physically depressed and held to be activated and the secondary switch which is separately connectible to each solenoid valve, is actuated by the primary switch in such a manner as to separately activate each solenoid valve to control the flow of brake fluid to the brake of each drive wheel.

7 Claims, 4 Drawing Figures

SELECTIVE CONTROL OF FLUID TO BRAKES

BACKGROUND OF THE INVENTION

This invention relates to a system for selectively controlling the flow of brake fluid to the brakes of the driven wheels of a motor vehicle. More particularly, this invention relates to a system for controlling the flow of brake fluid to the brakes of the driven wheels of a motor vehicle in such a manner that power may be manually transferred from one drive wheel to another through the differential of the vehicle by the application of the brakes.

Most vehicles are driven with one or two pair of drive wheels mechanically linked to a drive shaft by a differential. When such a vehicle is driven under circumstances which provide unfavorable traction, such as in mud, sand or snow, one wheel may have less traction than the other. The differential operates to automatically transfer power to the drive wheel having the least amount of traction. Under such conditions the wheel having the least amount of traction often will break free and spin while the opposite drive wheel is stationary or in a "stuck" position.

Some vehicles such as farm implements are provided with dual brake pedals to allow the spinning wheel to be braked thereby transferring power to the stationary wheel which then becomes "unstuck". This is also true in large vehicles where locking one brake is also used for steering purposes. However, the use of dual brake pedals in most cars and trucks would be most inconvenient and dangerous, especially when driving at high speeds.

U.S. Pat. Nos. 2,246,814 and 2,922,482 are typical of those showing brake control systems of large vehicles.

U.S. Pat. No. 1,682,781 proposes a system of brake control utilizing a controller which may be set for rendering only the right or left rear brake operable. This is an extreme disadvantage since the rendering of the brake on one drive wheel inoperable may cause the vehicle to swerve out of control as it becomes "unstuck" and before the controller can be changed to render both brakes operable.

U.S. Pat. No. 3,025,722 and 3,169,595 disclose control means for sensing wheel speed and automatically controlling the brakes when one wheel turns faster than the other by a predetermined amount. Such controls are expensive and require complicated electronic circuitry. Moreover, one wheel must always be spinning more rapidly than the other before the system can become actuated and lack the feature of being operator controlled.

OBJECTS AND BRIEF DESCRIPTION OF INVENTION

It is an object of the present invention to provide a system for manually selectively controlling the flow of brake fluid to the brakes of the drive wheels of a power driven vehicle.

It is also an object of the present invention to provide a system for temporarily and selectively controlling the flow of brake fluid to the brakes of a vehicle by manual means which requires constant action on the part of the operator.

Another object of the invention is to provide a system for manually controlling the flow of brake fluid to the brakes of a motor vehicle by electrically operated valve means which are selectively activated.

These and other objects may be accomplished by means of a system of electrically operated valves located on the brake lines leading directly to the drive wheels of a vehicle. The brake fluid system on most vehicles consists of a master cylinder having separate trunk feeding lines to each axle. The trunk line leading from the master cylinder to each axle is split into two branch lines by a T connector at the axle so that one branch line leads to each wheel. To control the flow of brake fluid to the brakes of drive wheels a solenoid valve is placed on the branch line between the wheel and the T connection with the result being that operation of the valve will control the flow of brake fluid to a single drive wheel. For non-driven wheels a solenoid valve is placed on the trunk line between the master cylinder and the T connector so that operation of the valve controls the flow of brake fluid to both wheels on the common axle. The valves are normally open and therefore close only when energized.

The valves are operated by a panel of primary and secondary switches. The primary switch is connected to the electrical system of the vehicle and is preferably in the form of a spring loaded push button switch which must be physically depressed and held in a depressed position in order to energize the secondary switch. The solenoid valve controlling the flow of brake fluid to the non-driven wheels is also energized by the primary switch. Therefore when the primary switch is activated the secondary switch is energized and the brakes on the non-driven wheels of a vehicle are rendered inoperative. This may be particularly useful when front non-driven wheels are in a skid or are sliding. By activating the primary switch the brakes are inoperative and the front wheels will turn enabling the operator of the vehicle to have greater control in steering. However the front brakes may be reapplied merely by releasing the primary switch.

The secondary switching means controls the flow of brake fluid to the brakes of the driven wheels. The secondary switch has three positions one off and two on or activated. Preferably this is a three-way toggle switch. In the off position the solenoid valves remain open. Each of the activated positions energize a separate solenoid. Hence, in one activated position the left drive wheel brake is rendered inoperative and in the other activated position the right drive wheel brake is rendered inoperative.

DRAWINGS

DESCRIPTION OF THE INVENTION

Figure 1:
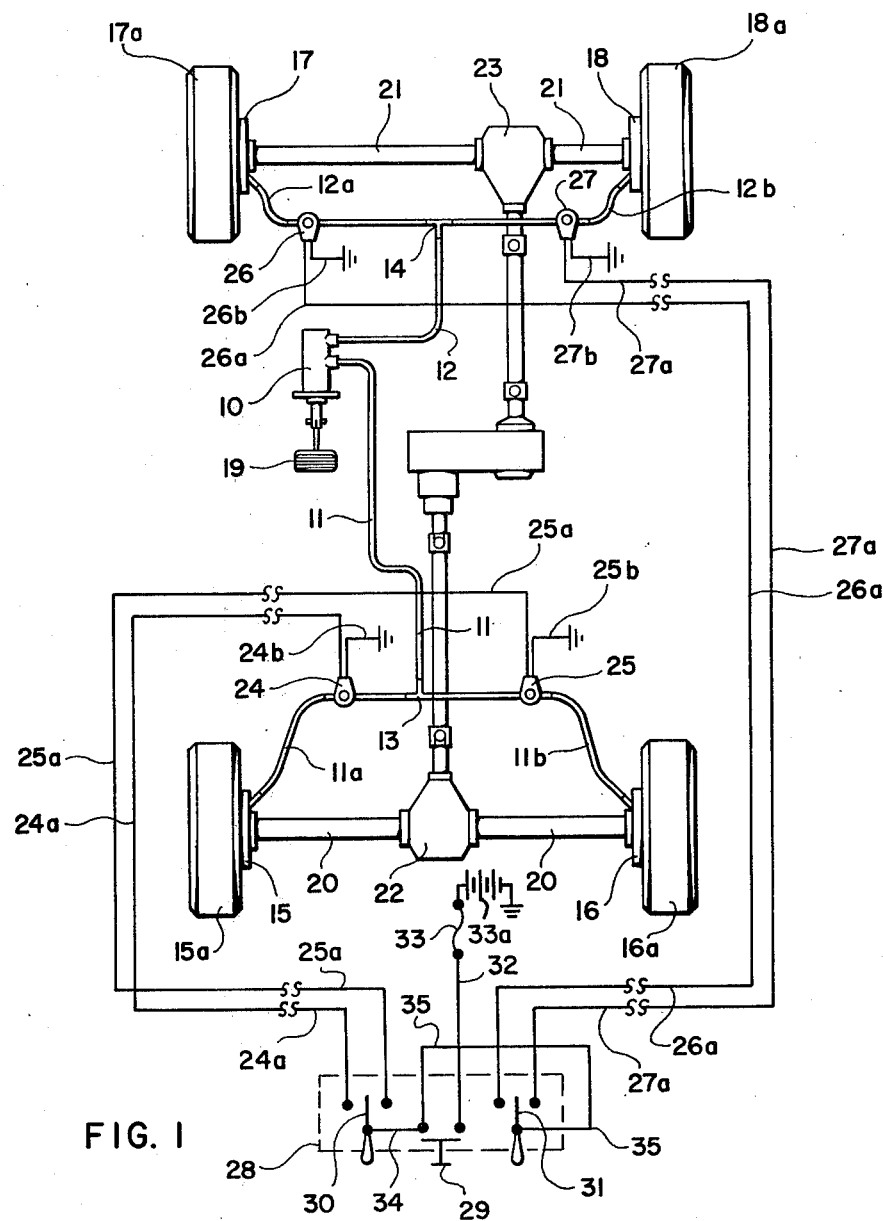
FIG. 1 is a diagrammatic view of one embodiment of the invention adapted for use on four wheel drive vehicles.
Figure 2:
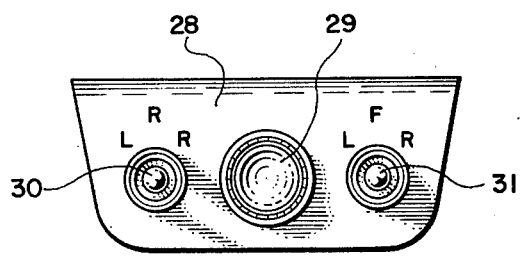
FIG. 2 is a view of a control panel suitable for use with the embodiment shown in FIG. 1.
Figure 3:
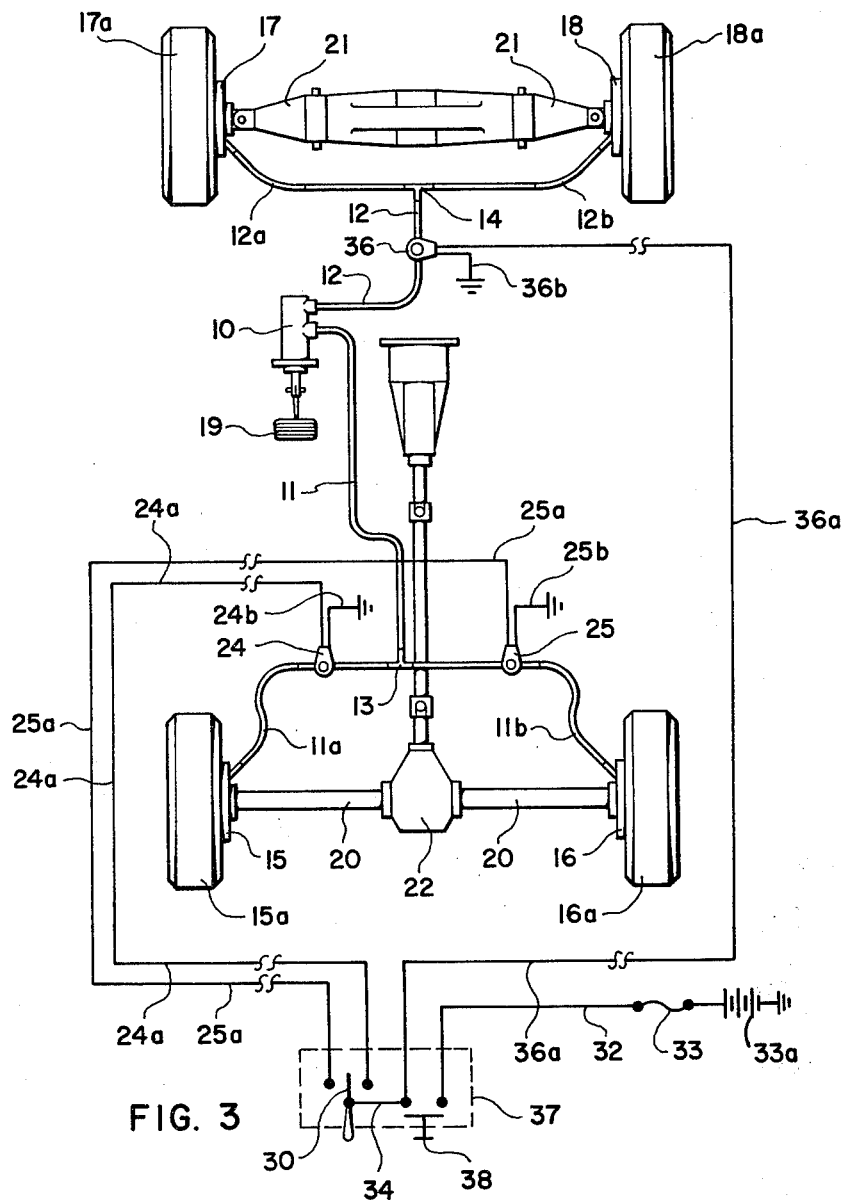
FIG. 3 is a diagrammatic view of another embodiment of the invention adapted for use on two wheel drive vehicles.
Figure 4:
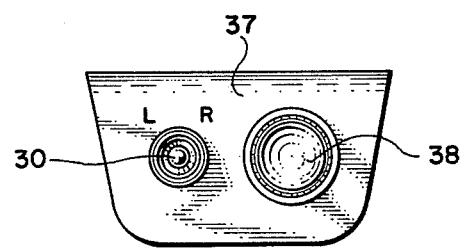
FIG. 4 is a view of a control panel suitable for use with the embodiment shown in FIG. 3.

There is shown in FIGS. 1 and 2 one complete embodiment of the invention. FIGS. 3 and 4 illustrate a second embodiment.

Most powered vehicles have two axles with the rear axle serving as part of the drive chain and containing a differential for transferring power from the drive shaft to the drive wheels. The front wheels are not driven and are used for steering. In some models of automobiles the front wheels are driven instead of the rear and the invention also applies to such vehicles. In four wheel drive vehicles both axles contain differentials and all four wheels are drive wheels. However, the front axle is generally adapted to disconnect from the drive chain and thus provide the vehicle with either two or four wheel drive.

Regardless of the number of drive wheels each wheel contains a brake which is fluid operated. The fluid is stored in a master cylinder 10 which has separate trunk feed lines 11 and 12 leading to the front and rear axles respectively. Lines 11 and 12 are divided by T connectors 13 and 14 into branch lines 11a and 11b in the rear, and branch lines 12a and 12b on the front which lead directly to the brakes 15, 16, 17 and 18. The brakes are activated or applied by the operator of the vehicle depressing brake pedal 19 which forces fluid from the master cylinder 10 through the brake lines to each brake.

Power is provided to each axle, 20 and 21 of a four wheel drive vehicle by drive shafts (not shown) to the differentials 22 and 23 of the respective axles and from thence to wheels 15a, 16a, 17a and 18a.

Since power through the differentials is transferred to the wheel having the least number of traction one may observe, from FIG. 1, that if wheels 15a or 17a on the left side of the vehicle become bogged down that wheels 16a and 18a may spin if they are left free to turn. By depressing brake pedal 19 all four brakes 15, 16, 17 and 18 are applied. Wheels 16a and 18a stop spinning but wheels 15a and 17a are also blocked from moving by the applied brakes.

However, by providing a system for selectively blocking brake lines 11a and 12a so that brakes 15 and 17 could not be applied one could stop the spinning of wheels 16a and 18a by application of brakes 16 and 18 and transfer the motive force to wheels 15a and 17a.

It is to be remembered that the invention applies to all wheels and could be applied just as easily if wheels 16a and 18a were stuck and wheels 15a and 17a were spinning.

The desired result may be accomplished by the following system:

A series of four solenoid valves 24, 25, 26 and 27 are placed on branch brake lines 11a, 11b, 12a and 12b respectively. The solenoid valves are normally open and are closed only when energized. The solenoid valves are attached to their respective brake lines adjacent the T connectors or by severing a line anywhere along its length. The valve is attached to a line with the inlet side facing its respective T connector and the outlet side leading to the brake.

Each solenoid contains two wires labeled 24a, 24b, 25a, 25b, 26a, 26b, 27a and 28b. The "b" wires are grounded to the vehicle while the "a" wires lead to a switch panel 28 as shown in FIG. 2. Panel 28 is mounted to the dash panel of the vehicle at a convenient location and consists of a primary push button switch 29 and two sedondary switches 30 and 31. Switches 30 and 31 may be three way toggle switches having a central "off" position and "on" or activated positions to the left and right of the "off" position. Lead wire 32 contains a fuse 33 and is plugged into the electrical system of the automobile 33a, such as battery or generated electrical source through the fuse box or other hot lead. Switches 30 and 31 are connected to primary switch 29 via lines 34 and 35.

Primary switch 29 is spring loaded so that to be activated it must be physically pushed inward and held in that position. Secondary switches 30 and 31 can only be activated when primary switch 29 is depressed and held. When the secondary switches are in the off position the solenoid valves remain de-energized. However, by moving switch 30 to the left, line 24a carries electrical current to solenoid valve 24 which closes preventing the application of brake 15. By moving switch 30 to the right solenoid 25 becomes energized preventing the flow of brake fluid to brake 16. Solenoids 26 and 27 may be similarly operated by switch 31.

Thus, in a four wheel drive vehicle as shown in FIGS. 1 and 2, one front brake and one rear brake can be deactivated by depressing primary switch 29 and flipping secondary toggle switches 30 and 31 either to the right or left. In most circumstances both secondary switches would be flipped in the same direction since chances are that if two wheels are spinning they will both be on the same side of the vehicle. However, it is possible to block the left front brake 17 and right rear brake 16 by flipping switches 30 and 31 to the right and left repsectively. When the primary switch is depressed, and the secondary switches are switched to activated positions the application of pressure to brake pedal 19 will apply the brakes to the wheels where the solenoid valves have not been activated thereby transferring motive power through differentials 22 and 23 to the wheels whose brake lines have been deactivated by the energized solenoid valves.

Once a vehicle becomes unstuck so that traction is being obtained on both wheels on an axle the operator merely lets go of switch 29 and the braking system returns to normal since switches 30 and 31 become deactivated. It is therefore evident that the blockage of brake fluid to certain selected brakes is temporary only and is completely under the control of the operator rather than being governed by external influences.

It is also apparent that, should switch 29 or switches 30 and 31 fail to operate, the braking system of the vehicle would function as it normally does since the solenoid valves are normally open.

FIGS. 3 and 4 demonstrate the application of the present invention to two wheel drive vehicles. The numerals on FIG. 3 are the same as those in FIG. 1 except where the functions have been changed. The brake lines, brakes and solenoid valves on the rear wheels of the vehicle are the same as for a four wheel drive vehicle. As shown in FIG. 3 a single solenoid valve 36 is placed on trunk brake line 12 between the master cylinder 10 and front T connector 14. Line 36b is attached to the body of the vehicle as a ground wire. Line 36a joins line 34 leading into switch panel 37 and is connected to primary switch 38 which is a spring loaded push button switch. Line 34 serves to connect primary switch 38 with secondary toggle switch 30. In this embodiment, depression of primary switch 38 causes solenoid valve 36 to close thereby blocking the flow of fluid to front brakes 17 and 18 as well as activating secondary switch 30. Since there are only two drive wheels in this embodiment it is essential that the brakes of the non-driven wheels 17a and 18a be rendered temporarily inoperative to enable the rear wheel being powered to propel the vehicle out of its stuck position. Another advantage to having the brakes of the non-driven wheels temporarily blocked occurs when the vehicle is in a skid. By depressing switch 38 the front wheels will rotate and restore better steering to the vehicle. This would be very difficult to accomplish by prior art means but is a simple matter when carried out according to the present invention.

While the invention has been described in the forms which are deemed to constitute the preferred embodiments, it is recognized that departures may be made therefrom and still be within the scope of the invention which is not to be limited to the details disclosed, but is to be accorded the full scope of the claims so as to include any and all equivalent systems.

I claim:

1. In a motor-driven vehicle having two axles, each axle containing a pair of drive wheels which are driven by a drive shaft connected to the drive wheels on each axle by a differential, wherein the rotation of each of said drive wheels is controlled by a brake actuated by the flow of brake fluid from a master cylinder through a trunk brake line leading to each of said axles, which trunk line is divided into two branch lines leading directly to the brakes of said drive wheels on said axle; a system for selectively controlling the flow of brake fluid to the brakes of the drive wheels which comprises
   (a) valve means located on each branch brake line leading directly to the brake of each drive wheel,
   (b) valve operating means comprising
      (1) a spring loaded depressible primary electrical switching means interconnecting the electrical system of said vehicle with a pair of secondary electrical switching means, said primary switching means being actuated only when manually being depressed and held in a depressed position,
      (2) a pair of manually operated secondary electrical switching means, each interconnecting said primary electrical switching means with the valves on the branch brake lines of a separate axle, said secondary switching means being operable only when the primary switching means is activated, each of said secondary switching means comprising a three-way switch having an off position and a first and second activated position,
      (3) said valves and primary and secondary switching means being interconnected such that when the primary switching means is activated, each secondary switching means become separately operable and functions such that in the off position, the valves on the branch lines interconnected with such secondary switch remain open; and when either secondary switch is manually moved to a first activated position, one valve on the branch line connected with said secondary switch closes and the other valve on the same axle remains open preventing the flow of brake fluid to the brake of one wheel on said axle and when in a second activated position, the opposite valve on said branch line closes and the valve which was closed when the secondary switch was in the first activated position remains open preventing the flow of brake fluid to the brake of the opposite wheel on said axle.

2. A system according to claim 1 wherein the valve means are solenoid valves.

3. A system according to claim 2 wherein the primary switching means is in the form of a depressible push button switch.

4. In a motor-driven vehicle having a pair of drive wheels on a first axle which is driven by a drive shaft connected to the drive wheels through a differential and one pair of non-driven wheels on a second axle wherein the rotation of each of said drive wheels and non-driven wheels is controlled by a brake actuated by the flow of brake fluid from a master cylinder through a trunk brake line leading to each of said axles which trunk line is divided into two branch lines leading directly to the brakes of the wheels on said axle; a system for preventing the flow of brake fluid to the brakes of the non-driven wheels and selectively controlling the flow of brake fluid to the brakes of the drive wheels which comprises:
   (a) valve means located on each branch brake line leading directly to the brake of each drive wheel and valve means located on the trunk brake line which interconnects the brakes of the non-driven wheels with the master cylinder,
   (b) valve operating means comprising
      (1) a spring loaded depressible primary electrical switching means interconnecting the electrical system of said vehicle with a secondary electrical switching means and with the valve means on the trunk line interconnecting the brakes of the non-driven wheels of said vehicle with the master cylinder, said primary switching means being activated only when manually being depressed and held in a depressed position, and
      (2) manually operated secondary electrical switching means interconnecting said primary electrical switching means with each valve means located on a branch brake line leading to the brakes of a driven wheel, said secondary switching means being operable only when the primary switching means is activated, said secondary switching being a three-way switch means having an off position and a first and second activated position,
      (3) said valves and primary and secondary switching means being interconnected such that when the primary switching means is activated the secondary switching means becomes operable and the valve on the trunk brake line closes preventing the flow of brake fluid to the brakes of the non-driven wheels of the vehicle and the secondary switching means functions such that in the off position the valves on the branch lines leading to the brakes of a driven wheel remain open and when in a first-activated position, one valve on a branch line closes and the other valve remains open preventing the flow of brake fluid to the brake of one drive wheel on the axle and when in a second activated position the valves on said branch lines reverse positions preventing the flow of brake fluid to the brake of the opposite drive wheel on said axle.

5. A system according to claim 4 wherein the valve means are solenoid valves.

6. A system according to claim 5 wherein the drive wheels of the vehicle are the rear wheels.

7. A system according to claim 6 wherein the primary switching means is in the form of a depressible push button switch.

* * * * *